United States Patent [19]
Merritt et al.

[11] Patent Number: 5,182,572
[45] Date of Patent: Jan. 26, 1993

[54] DEMAND INK JET UTILIZING A PHASE CHANGE INK AND METHOD OF OPERATING

[75] Inventors: Alfred R. Merritt; Theodore M. Cooke, both of Danbury; An-Chung R. Lin, New Town; Richard G. Whitfield, Brookfield, all of Conn.

[73] Assignee: Dataproducts Corporation, Woodland Hills, Calif.

[21] Appl. No.: 685,979

[22] Filed: Apr. 15, 1991

Related U.S. Application Data

[63] Continuation of Ser. No. 93,151, Sep. 2, 1987, abandoned, which is a continuation of Ser. No. 938,334, Dec. 4, 1986, abandoned, which is a continuation of Ser. No. 610,627, May 16, 1984, abandoned, which is a continuation-in-part of Ser. No. 507,918, Jun. 27, 1983, Pat. No. 4,484,948, which is a continuation of Ser. No. 331,604, Dec. 17, 1981, Pat. No. 4,390,369.

[51] Int. Cl.$^5$ ............................................. B41J 2/04
[52] U.S. Cl. ................................. 346/1.1; 346/140 R
[58] Field of Search ................ 346/140, 1.1; 400/120, 400/126

[56] References Cited

U.S. PATENT DOCUMENTS

| | | |
|---|---|---|
| 3,247,519 | 4/1966 | Shiuonen . |
| 3,282,709 | 11/1966 | Ehrhardt et al. . |
| 3,330,673 | 7/1967 | Voet et al. . |
| 3,353,974 | 11/1967 | Trimble et al. . |
| 3,369,253 | 3/1968 | Sihuonen . |
| 3,421,910 | 1/1969 | Gilson et al. . |
| 3,596,285 | 7/1971 | Gottwald . |
| 3,653,932 | 4/1972 | Berry et al. ............................ 106/22 |
| 3,683,212 | 8/1972 | Zoltan .................... 346/140 |
| 3,715,219 | 2/1973 | Kurz et al. ..................... 106/22 |
| 3,846,141 | 11/1974 | Ostergren et al. . |
| 3,994,736 | 11/1976 | Herz et al. . |
| 4,018,728 | 4/1977 | Priest . |
| 4,021,252 | 5/1977 | Banczah et al. . |
| 4,066,585 | 1/1978 | Schepp et al. . |
| 4,069,179 | 1/1978 | Jones . |
| 4,106,030 | 8/1978 | Hampton et al. . |
| 4,108,671 | 8/1978 | Richlin . |
| 4,136,076 | 1/1979 | Daniels . |
| 4,150,997 | 4/1979 | Hayes . |
| 4,153,467 | 5/1979 | Yano et al. . |
| 4,165,399 | 8/1979 | Germonprez . |
| 4,171,981 | 10/1979 | Austin et al. . |
| 4,176,361 | 11/1979 | Kawada et al. . |
| 4,215,352 | 7/1980 | Corwin . |
| 4,218,252 | 8/1980 | Yokoyama . |
| 4,238,807 | 12/1980 | Bovio et al. . |
| 4,243,994 | 1/1981 | Kobayashi et al. . |
| 4,248,746 | 2/1981 | Greiner . |
| 4,250,512 | 2/1981 | Kattner et al. ............... 346/140 PD |
| 4,251,824 | 2/1981 | Hara et al. . |
| 4,273,847 | 6/1981 | Lennon et al. . |
| 4,279,653 | 7/1981 | Makishima et al. . |
| 4,281,329 | 7/1981 | Yano et al. . |
| 4,296,421 | 10/1981 | Hara et al. . |
| 4,303,445 | 12/1981 | Whitfield et al. . |
| 4,312,009 | 1/1982 | Lange . |
| 4,320,406 | 3/1982 | Heinzl . |
| 4,337,183 | 6/1982 | Santiago . |
| 4,353,078 | 10/1982 | Lee et al. ...................... 346/140 PD |
| 4,361,483 | 11/1982 | Cooke et al. . |
| 4,376,283 | 3/1983 | Bower ......................... 346/140 PD |
| 4,381,946 | 5/1983 | Uehara et al. . |
| 4,389,657 | 6/1983 | McMahon . |
| 4,392,146 | 7/1983 | Bould et al. . |
| 4,395,287 | 7/1983 | Kobayashi et al. . |
| 4,400,215 | 8/1983 | Cooke et al. . |
| 4,409,040 | 10/1983 | Tabayashi et al. . |
| 4,421,559 | 12/1983 | Owatari . |
| 4,426,227 | 1/1984 | Keeling et al. . |
| 4,443,820 | 4/1984 | Mutoh et al. . |
| 4,459,601 | 7/1984 | Hawkins . |
| 4,462,035 | 7/1984 | Koto . |

(List continued on next page.)

Primary Examiner—Mark J. Reinhart
Attorney, Agent, or Firm—Woodcock Washburn Kurtz Mackiewicz & Norris

[57] ABSTRACT

A demand or impulse ink jet ejects droplets of hot melt ink. The hot melt ink is heated from a solid state to a liquid state in the jet prior to the ejection of droplets on demand. The ink is then cooled on striking the target. The ink may contain a wax.

19 Claims, 3 Drawing Sheets

U.S. PATENT DOCUMENTS

| | | |
|---|---|---|
| 4,468,680 | 8/1984 | Martner .................... 346/140 PD |
| 4,472,537 | 9/1984 | Johnson et al. . |
| 4,475,113 | 10/1984 | Lee ............................ 346/140 PD |
| 4,490,731 | 12/1984 | Vaught ........................ 346/140 R |
| 4,509,059 | 4/1985 | Hawkins . |
| 4,531,976 | 7/1985 | Lin . |
| 4,539,570 | 9/1985 | Moore . |
| 4,550,324 | 10/1985 | Tamaru et al. . |
| 4,597,794 | 7/1986 | Ohta et al. . |

FOREIGN PATENT DOCUMENTS

| | | |
|---|---|---|
| 0097823 | 1/1984 | European Pat. Off. . |
| 0099682 | 2/1984 | European Pat. Off. . |
| 0037195 | 6/1984 | European Pat. Off. . |
| 0097823 | 11/1984 | European Pat. Off. . |
| 0206286 | 12/1984 | European Pat. Off. . |
| 0152247 | 8/1985 | European Pat. Off. . |
| 51-39495 | 10/1976 | Japan . |
| 53-95027 | 8/1978 | Japan . |
| 55-54368 | 4/1980 | Japan . |
| 56-113462 | 7/1981 | Japan . |
| 56-113472 | 9/1981 | Japan . |
| 57-49072 | 10/1982 | Japan . |
| 58-208062 | 12/1982 | Japan . |
| 58-116162 | 7/1983 | Japan . |
| 1424722 | 2/1976 | United Kingdom . |

OTHER PUBLICATIONS

Sweet, "High Frequency Oscilloagraphy With Electrostatically Deflected Ink Jets", Stanford Electronics, No. 1722–Mar. 1, 1964.

Sweet, "High Frequency Recording With Electrostatically Deflected Ink Jets", The Review of Scientific Inst. vol. 36, No. 2, pp. 131–136 Feb. 1965.

IBM Tech Disc. Bull. vol. 26, No. 3A.

Abstract No. K5010 C/44, "High Speed Recording Equipment Drop Generator", Dec. 23, 1980.

"It's Sunnyside Up for Ink Jet Printing", American Printer and Lithographer, pp. 56–58, Sep. 1980.

Owens, "New Ink-Writing Methods For Graphic Recording", Instruments and Control Systems, vol. 38, pp. 100–102, Jul. 1965.

Abstract No. 702458 39, "Ink for Hot Ink Jet Recording Process", Mar. 3, 1978.

Abstract No. J55148-774, "Low Softening Point Ink for Jet Recording", May 2, 1979.

Abstract No. J3503 C/39, "Ink Jet Printer with Uniform Droplets", Apr. 2, 1979.

Abstract No. 35067 C/20, "Ink Jet Recording With Heating Element A Junction of Liquid Inlet", Dec. 28, 1978.

Abstract No. L6528 c/49, "Print Head for Ink Jet Printer", Nov. 27, 1980.

Romano, "Digital Technologies Will Become More Commonplace", American Printer and Lithographer, p. 58, Nov. 1979.

Abstract No. 77/17,758 "Magnetic Ink Jet Printing Process" Sep. 9, 1978.

Abstract No. 80083 B/44, "Recording Medium for Ink Jet Recording Process", Mar. 15, 1978.

Abstract No. 107587, "Inks for Ink Jet Recording", May 17, 1974.

Abstract No. 06955 B/04, "Oily Ink Compensation for Stamping, Recording Jet Printing", May 18, 1977.

Abstract No. 43987 C/25 "Non-Impact Recording Process", Oct. 31, 1978.

Abstract No. 45784 C/26, "Quick Drying Ink for Ink Jet Recording" Nov. 10, 1978.

Abstract No. 47097 C/27 "Quing Drying Ink for Ink Jet Recording" Nov. 13, 1978.

Abstract No. 8929 X/48, "Ink Compensation for Ink Injection Type Recording Apparatus", Nov. 28, 1973.

Abstract No. 95/229,337 "Preparation of Hectographic Plates" 74–Radiation Chem. Photochem. vol. 85, p. 643 (1981).

Bennett, H., "Industrial Waxes", vol. 1 (Chapters 1, 2, 10, 11) and vol. 2 (Chapter 2, pp. 81–91, 167–173, 236–237( 1975).

CRC Handbook of Chemistry and Physics p. C-283 1979-80 Edition.

Owens, New Ink-Writing Methods for Graphic Recording, *Instruments & Control Systems* vol. 38, Jul. 1965.

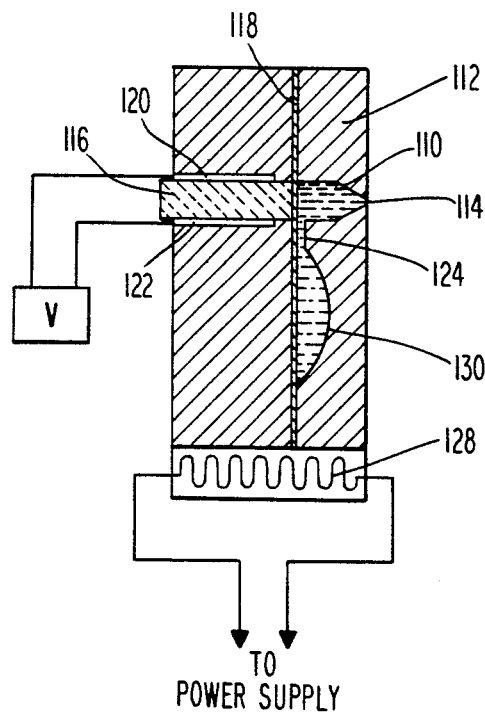
_Fig. 6_
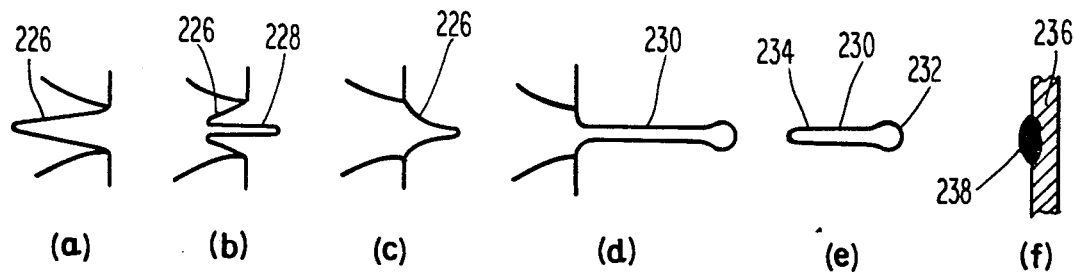
_Fig. 7_

DEMAND INK JET UTILIZING A PHASE CHANGE INK AND METHOD OF OPERATING

RELATED APPLICATIONS

This is a continuation of application Ser. No. 093,151, filed Sep. 2, 1987, now abandoned which is a continuation of application Ser. No. 938,334, filed Dec. 4, 1986, which in turn is a continuation of application Ser. No. 610,627, now abandoned filed May 16, 1984, which is a continuation-in-part of application Ser. No. 507,918, filed Jun. 27, 1983 now U.S. Pat. No. 4,484,948, which in turn is a continuation of application Ser. No. 331,604, filed Dec. 17, 1981, now U.S. Pat. No. 4,890,369.

BACKGROUND OF THE INVENTION

This invention relates to demand or impulse ink jets of the type wherein droplets of ink are fired at varying time intervals as required or demanded for printing.

A demand or impulse ink jet comprises an ink jet chamber including an orifice from which droplets are ejected and an ink supply inlet coupled to a source or reservoir of ink. In such a jet, a driver is coupled to the chamber such that the change in state of energization of the driver results in the ejection of a droplet of ink from the orifice. By changing the state of energization of the driver at the appropriate moment, a droplet of ink may be ejected on demand in a trajectory directed at a suitable substrate or target such as paper.

Copending applications Ser. No. 336,603, filed Jan. 4, 1982 and Ser. No. 576,582, filed Feb. 3, 1984 disclose an ink jet apparatus comprising an array of demand or impulse ink jets where each jet ejects a droplet of ink from an orifice in response to the expansion and contraction of drivers in the form of elongated transducers which are energized in response to a field selectively applied transversely to the axis of elongation. As a result, substantial displacement of the transducers is achieved which is capable of ejecting a droplet of ink.

Heretofore, demand or impulse ink jets of this type have employed an ink which is stored in a reservoir in a liquid state supplied to one or more ink jet chambers in a liquid state and ejected from the chambers through the orifice in a liquid state. Upon ejection, the droplets dry on the target which receive the droplets over a certain length of time which is a function of the particular ink utilized.

Inks utilized in such demand or impulse ink jets may be of various types. Water-based inks may be used with demand ink jets and may be incompatible with paper having poor penetration and drying characteristics with respect to the paper. On the other hand, oil-based inks which are more compatible with paper, have low surface tension and generally provide ink dots which are too large to give good print quality. Inks stored in a liquid state whether oil or water-based may undergo some deterioration, evaporation and degeneration including the possible pick-up of dirt, dust and other particulate matter. Moreover, liquid inks which are pigmented may undergo settling and agglomeration. The shelf-life may, therefore, be limited.

In continuous ink jets wherein droplets are continuously ejected at regular intervals and deflected where not desired, inks have been employed which undergo a phase change. When ink is stored within a reservoir supplying an ink jet chamber continuously ejecting well-formed spherical droplets, the ink must be heated. Liquid ink is then ejected and cooled after striking a suitable target. In such a continuous ink jet, the ink is constantly under pressure and droplets are continuously ejected from the orifice over some distance and length of time so as to permit cooling to the phase change temperature before striking the paper. See, for example, U.S. Pat. Nos. 3,715,219 and 3,653,932 for a disclosure of a continuous jet with a phase change ink.

SUMMARY OF THE INVENTION

It is an object of this invention to operate a demand ink jet in the manner so as to achieve a high quality printing.

It is a more specific object of this invention to operate a demand ink jet so as to achieve a high resolution in printing; e.g., small circular dots with good edge definition and contrast.

It is a still further object of this invention to operate a demand ink jet so as to print with high quality and high resolution on a variety of substrates or targets.

It is a further object of this invention to operate a demand ink jet with stable ink.

In accordance with these and other objects of the invention, an impulse ink jet juxtaposed to a target comprises a reservoir and an ink jet chamber including an orifice for ejecting droplets and an inlet coupled to the reservoir for receiving ink. A volume of ink in the reservoir and the chamber forming a meniscus of ink in the orifice is heated so as to produce a change in phase from a substantially solid state below a predetermined temperature to a substantially liquid state above the temperature. Droplets are formed in a liquid state on demand at the meniscus at irregular intervals and subsequently ejected. The ejected droplets then contact the substrate at which time cooling occurs so as to promptly change the droplets on the substrate from a liquid to a solid state.

In accordance with one important aspect of the invention the droplets in the liquid state have a viscosity no greater than 35 centipoise and preferably no greater than 15 centipoise.

In accordance with another important aspect, the ink is heated to a temperature in excess of 150° F.

In accordance with another important aspect of the invention, the ink in the reservoir is maintained at little or no pressure, i.e., substantially atmospheric pressure.

In accordance with another important aspect of the invention, the transit time of the droplet is minimized. In this connection, the drop travels no more than 0.6 cm to the target. This travel occurs at a velocity more than 2 m/sec, preferably more than 4 m/sec. and optimally more than 10 m/sec.

In accordance with another important aspect of the invention, the temperature of the ink is elevated to more than 10° F. above the solid to liquid transition and preferably 20° F.

In accordance with a further aspect of the invention, the droplet striking the target actually forms a mechanical bond. Where the target comprises a fibrous material with capillarity and appreciable porosity, the droplet actually penetrates the target. In such a target, at least 20% volume of the ink is absorbed into the target and preferably at least 50% of the volume of ink is absorbed into the target. However, at least 10% of the volume of the ink is not absorbed and preferably at least 40% so as to provide a three dimensional effect of the droplet on the target, i.e., penetration of the droplet into the target results in a particularly strong mechanical bond with the target.

In accordance with a still further important aspect of the invention, the maximum cross-sectional dimension of the drop on the target does not exceed three times the maximum cross-sectional dimensions of the drop traveling toward the target in the liquid state.

In accordance with another aspect of the invention, the ink contains wax.

In a preferred embodiment of the invention, the plurality of jets are utilized in an array so as to eject droplets in a liquid state on demand from various jets. Individual droplets from the individual jets are then cooled at the substrate in accordance with this invention.

BRIEF DESCRIPTION OF THE DRAWINGS

FIG. 6 is a cross-sectional, partially schematic diagram of another embodiment of the invention; and FIGS. 7(a-f) is a sequential diagrammatic representation of a droplet of ink passing from the orifice to the target in accordance with this invention.

DETAILED DESCRIPTION OF A PREFERRED EMBODIMENT

Figure 1:
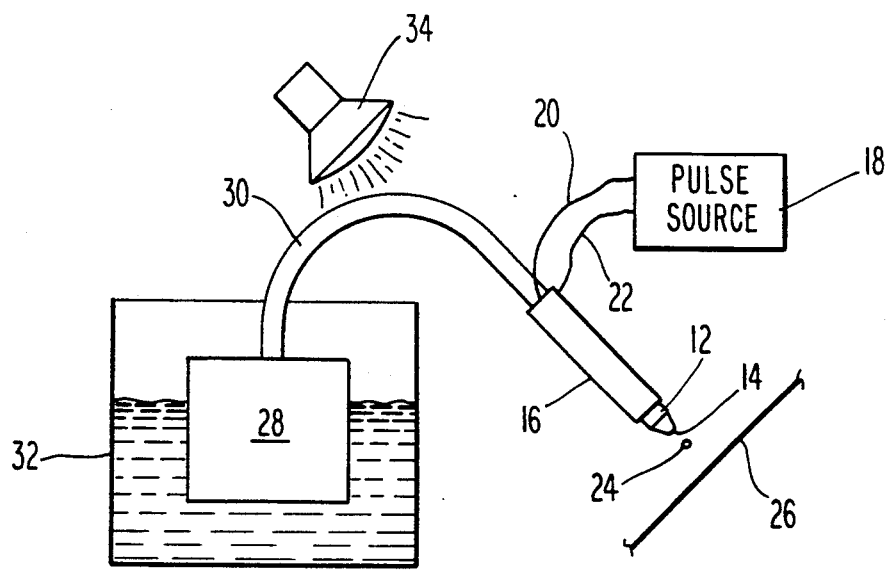
FIG. 1 is a schematic diagram of a demand ink jet system embodying this invention.

Referring to FIG. 1, an ink jet apparatus is disclosed including an ink jet employing a housing 12 including a nozzle having an orifice 14. The housing 12 which includes a chamber is encircled by a piezoelectric transducer 16. The transducer 16 is energized and de-energized in response to the application of a voltage from a pulse source 18 which is supplied between leads 20 and 22.

Droplets of ink 24 are ejected from the orifice 14 toward a target 26 which may comprise paper or other suitable substrate. Ink is supplied to the jet from a reservoir 28 through a coupling tube 30.

In accordance with this invention, the ink within the reservoir is a phase change ink which is solid at lower temperatures and liquid at elevated temperatures after passing through a phase change transition. A suitable ink is a wax-containing ink which is solid or semi-solid at ambient temperature but is liquid at elevated temperatures so as to permit discharge from the orifice 14.

In accordance with this invention, the ink which is heated to the elevated temperature will solidify and form a mechanical bond when it comes in contact with a suitable target 26 such as paper or other cellulosic material. The rate of solidification of the ink which may contain wax will control the degree of penetration into the paper. Where paper is used, its fibrous and porous nature exhibiting a high degree of capillarity results in an even stronger mechanical bond due to the penetration of the ink and greater contact with a greater surface area.

Phase change inks of the type contemplated herein are particularly desirable since they produce a small circular dot. As a general rule for a given temperature, inks containing wax as a major component thereof will have less penetration into the paper and therefore a smaller and more circular dot than inks containing additive amounts of wax which will further penetrate the paper and produce larger circular dots.

In accordance with this invention, the heating of the ink to an elevated temperature is accomplished by emersing the reservoir 28 in a hot water bath 32 or subjecting the reservoir 28 to other suitable heating means. The coupling tube 30 and the jet itself are heated by an infrared light 34.

Figure 2:
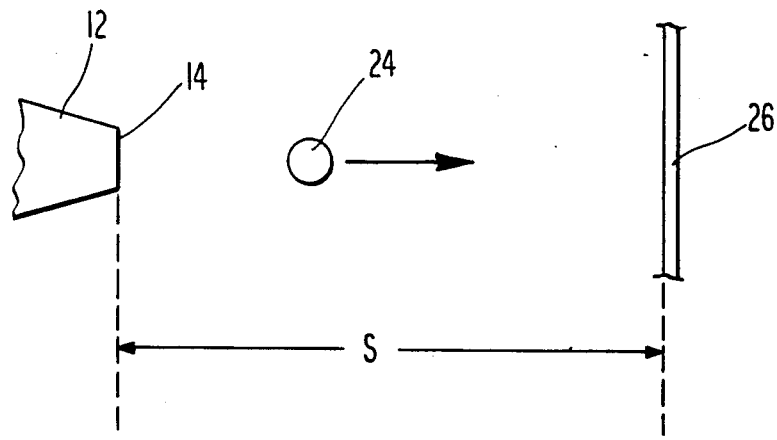
FIG. 2 is an enlarged partially schematic diagram of a droplet of ink traveling from an orifice to a target in accordance with this invention.

Referring to FIG. 2, the orifice 14 is shown juxtaposed to the target 26 with a droplet 24 moving toward the target 26. In accordance with this invention, it is particularly important that the droplet 24 remain at a sufficiently elevated temperature so as not to be in a liquid to solid phase transition at the time that it strikes the target 26. In this connection, it is particularly important that the velocity of the droplet 24 and the spacing S between the orifice 14 and the target 26 assure a sufficiently short trajectory time to maintain the droplet 24 in the liquid state. For this purpose, it is desirable that the spacing S not exceed 0.6 cm. It is also desirable that the velocity of the droplet 24 be at least 2 m/sec, preferably more than 4 m/sec and optimally more than 10 m/sec. This will assure that the droplet 24 is still in the liquid state upon contact with the target 26 if the ink is heated to a temperature above the phase change transition point.

Figure 3:
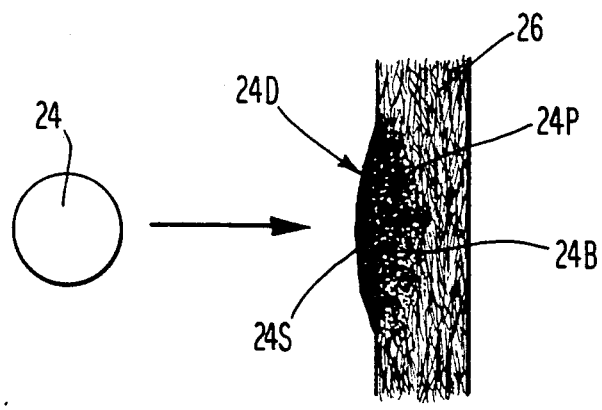
FIG. 3 is a partially schematic enlarged view of a droplet traveling to and penetrating a target in accordance with this invention.

By assuring that the droplet 24 is in the liquid state when it strikes the target 26, a good bond is assured between the ink and the target. As shown in FIG. 3, contact between the fibrous target 26 and the ink 24 in the liquid state assures, because of the capillarity of the target, substantial penetration of the droplet 24D when deposited on the target 26. Preferably, at least 10% of the volume of the droplet 24D actually penetrates the target and optimally as much as 50% or more. This produces a substantial portion 24P within the target 26 itself producing a substantial bonding surface area 24B. On the other hand, the portion 24S of the droplet on the surface of the target 26 represents less than 50% of the droplet. It is, however, desirable that the portion 24S represent at least 10% and preferably more than 40% so as to provide a raised droplet on the surface 26, i.e., the portion 24S extends above the paper 26. This three dimensional effect results in high quality printing.

Figure 4:
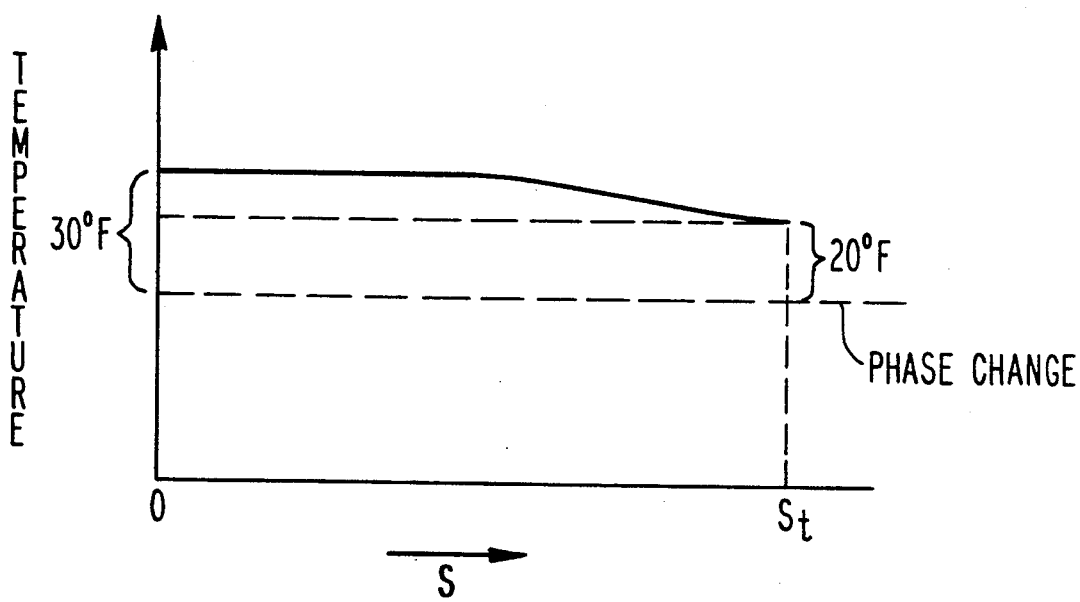
FIG. 4 is a graphical representation of the temperature of a droplet in transit to a target.

Referring to FIG. 4, the spacing between the orifice 14 and the target 26 as depicted on the horizontal axis where $S_t$ represents the position of the target itself. The vertical axis depicts temperature. As shown, it is preferred that the ink have a melting point or phase transition point of 135° to 200° F. In this connection, it is preferred to heat the ink to a temperature at least 30° F. above the melting or phase transition point so as to permit some cooling of the ink by the time the droplet reaches the target. This will assure that the temperature of the droplet when striking the target 26 is at least 10° F. and preferably 20° F. above the transition point. For example, for a transition point of 150° F., it is desirable that the ink be heated to a temperature of at least 180° F. so as to assure that the ink upon contacting the target will be at least 160° F. and preferably 170° F.

Figure 5:
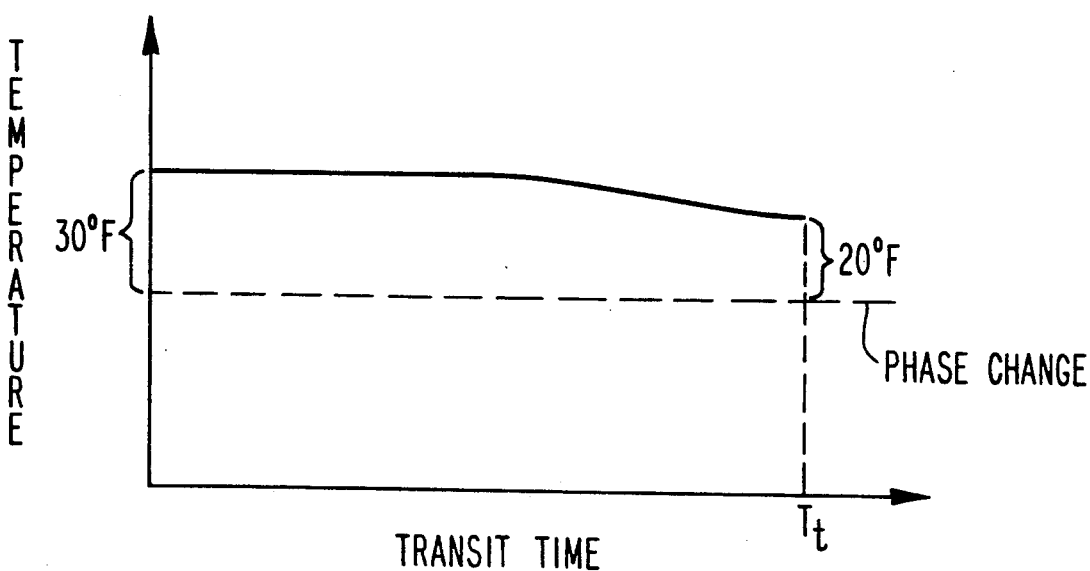
FIG. 5 is a diagrammatic view representing the temperature of a droplet as a function of transit to the target.

Referring to FIG. 5, transit time is depicted as a function of temperature. Where $T_t$ represents the time in which the droplet strikes the target. In order to assure that the temperature of the droplet at the time of striking the target is well above the transition point, the transit time of less than 30 msecs. and preferably less than 6 msecs. is preferred.

Referring to FIG. 6, a demand or impulse ink jet comprises a chamber 110 within a housing 112 including an orifice 114. The transducer 116 is coupled to the chamber 110 through a diaphragm 18 at the rear of the chamber opposite the orifice 114. The transducer 116 is energized and de-energized in response to the application of a pulsed voltage V across electrodes 120 and 122 so as to create a field transverse to the transducer 116. Ink is supplied to the chamber 10 through an inlet 24.

In accordance with this invention, the volume of ink within the reservoir or manifold 130 supplying the inlet 124 as well as the chamber 110 is heated so as to maintain the ink in a liquid state. In the absence of such heat, the ink returns to a solid state, in other words, the ink undergoes a phase change when heated to a liquid state so as to be in a state of readiness for ejection from the orifice 114 upon demand. The reservoir 130 may be served by an even larger reservoir not shown.

The heating of the volume of ink within the chamber 110 is accomplished by electrical heating means. As shown in FIG. 1, the heating means are depicted by a resistance 128 coupled to a power supply.

It will be appreciated that the meniscus in the orifice 14 is heated at all times to a sufficiently high temperature so as to maintain the ink in a liquid state. In other words, the ink is not permitted to solidify at the meniscus. The state is maintained at all times notwithstanding the fact that there may be no ejection of a droplet from the orifice 14 for an extended period of time, e.g., minutes or even hours. It will, of course, be appreciated that there is no substantial pressure or head within the chamber 110. In fact, any pressure within the chamber 110 may be slightly negative.

Reference will now be made to FIG. 7 wherein the formation of a droplet from the meniscus shown in FIG. 2 is demonstrated. FIG. 7(a) depicts the meniscus 226 in the retracted position shown in FIG. 2. FIG. 7(b) illustrates the onset of the formation of a droplet when the transducer 116 is initially de-energized so as to expand toward the orifice 114 as shown in FIG. 2. Note that an elongated segment 228 is formed in the meniscus at this time as shown in FIG. 7(b).

FIG. 7 shows the continued formation of the droplet as the meniscus 226 advances to a point external to the orifice 114. In FIG. 7(d), the meniscus advances further and the formation of a ligament 230 is seen. At FIG. 7(e), the ligament 230 is broken off and is now traveling toward the target. Note that the head 232 of the ligament 230 is enlarged, i.e., has a larger cross-sectional area, than the tail 234 of the ligament 230. Despite the elongated nature of the ligament 230, the temperature of the ink is sufficiently high so as to maintain this ligament in a liquid state throughout its trajectory toward the target.

As shown in FIG. 7(f), the ligament 230 has contacted a substrate or target 236 so as to form a droplet 238 upon contact with the target 236, the droplet 238 begins to solidify as the temperature drops.

As shown in FIG. 3 as well as FIG. 7f, the droplet 24d as well as the droplet 238 does not have a substantially larger maximum cross-sectional dimension than that droplet 24 and the droplet or ligament 230 respectively. Preferably, the maximum cross-sectional dimension of the droplet on the target is no more than three times the maximum cross-sectional dimension of the droplet in flight.

A particularly suitable thermally reversible, phase change ink for use in this invention is a wax-based ink. Such an ink may contain but is not necessarily limited to natural waxes such as Japan wax, candellila wax, carnauba wax, etc.

The ink composition can contain waxes in an approximate range from 0.5 to 97.0 percentage by weight. The wax may be the basic fluid vehicle of the ink or may be used as an additive to other fluidic vehicles such as fatty acids, and more particularly oleic acid, and oleic acid with benzyl ether, etc.

Within the definition of the natural wax of this invention are also included compounded waxes which may include synthetic substances, resins and meltable polymeric materials.

A coloring agent or dye such as an oil or solvent soluble dye is usually added to the composition for visibility.

Inks of this type have been found to provide highly repetitive dots of small size and extremely good print quality. Print quality is generally a measure of the circularity of the dot. The present inventive natural waxes provide circularities of 0.7 or better as measured by the technique described in U.S. application Ser. No. 248,551, filed Mar. 27, 1983, now U.S. Pat. No. 4,361,843, issued Nov. 30, 1982; which technique is meant to be incorporated hereby by way of reference.

The ink formulations of this invention find particular applicability in impulse ink jet apparatuses, but are not limited thereto.

Specific formulations which have been found to provide good ink dot circularlity are presented in Table I below:

TABLE I

|  | 1 | 2 | 3 | 4 | 5 | 6 |
|---|---|---|---|---|---|---|
| Oleic Acid | 15.8 |  |  | 67.5 | 60.0 | 26.0 |
| Benzyl Ether | 60.0 |  |  |  |  | 60.5 |
| Typophor Black | 24.0 |  |  | 22.5 | 20.0 |  |
| Calco Chinoline Yellow | 0.2 |  |  |  |  |  |
| Candelilla Wax | 20.5 |  |  | 10.0 | 20.0 | 0.5 |
| Japan Wax |  | 97 | 95 |  |  |  |
| HD Victoria Blue |  |  |  |  |  | 0.5 |
| Calco Nigrosine Base |  |  |  |  |  | 13.0 |
| Acetosol Yellow RLSN |  |  |  |  |  | 2.5 |
| Oil Black BN |  | 3 | 5 |  |  |  |
| Viscosity | 6.7 (165° F.) | 11.8 (165° F.) 18.9 (57° F.) 16.3 (65° F.) | 12.3 (165° F.) | 13.4 (165° F.) | 15.7 (165° F.) |  |

TABLE I-continued

| 1 | 2 | 3 | 4 | 5 | 6 |
|---|---|---|---|---|---|
| | 12.3 (74° F.) | | | | |

*measured in centipoise

Another ink formulation not involving the use of natural waxes is the following:

| | |
|---|---|
| Stearone | 30 |
| Acrylic Polymer (Acryloid D-55 by Rohm & Haas) | 2 |
| Hydrofol 2260 (by Sherex Chemicals (containing approximately 60% behrenic acid and 40% stearic acid) | 65 |
| Calco Nigrosine Base | 3 | having a viscosity of 9.5 centipoise at 90° C.

The above ink formulations provide dots which produce characters approaching and surpassing typewriter quality printing. As such the above formulations are believed to provide inks which result in the finest print quality in the ink jet art.

The above formulations are, however, meant to be only exemplary, and are meant to provide a general teaching and understanding of the invention.

Additional details concerning the ink jet apparatus disclosed in FIG. 6 are disclosed in copending application Ser. No. 336,603, filed Jan. 4, 1982, Ser. No. 576,582, filed Feb. 3, 1984 and Ser. No. 384,131, filed Jun. 1, 1982 which are incorporated herein by reference and disclose a plurality of ink jets. Other details concerning the ink and apparatus are disclosed in copending application Ser. No. 507,918, filed Jun. 27, 1983 which is incorporated herein by reference.

Although a preferred embodiment of the invention has been shown and described, it will be understood that other demand ink jets may be employed for phase change inks and such demand ink jets and their method of operation will fall within the true spirit and scope of the invention as set forth in the appended claims.

We claim:

1. A method of operating an impulse system for jetting a meltable ink which undergoes a thermally reversible liquid to solid phase transition, said method comprising the following steps:
   elevating the temperature of said ink so as to effect a solid to liquid transition; and
   ejecting a drop of liquid ink on demand toward a target wherein the drop strikes the target while in the liquid phase and undergoes a liquid to solid phase transition after striking the target and the drop travels no more than 0.6 cm to the target.

2. The method of claim 1 wherein the drop travels at a velocity of more than 2 m/sec.

3. The method of claim 1 wherein the drop travels at a velocity of more than 4 m/sec.

4. The method of claim 1 wherein the drop travels at a velocity of more than 10 m/sec.

5. A method of operating an impulse system for jetting a meltable ink which undergoes a thermally reversible liquid to solid phase transition, said method comprising the following steps:
   elevating the temperature of said ink more than 10° F. above the solid to liquid transition point so as to effect a solid to liquid transition; and
   ejecting a drop of liquid ink on demand toward a target wherein the drop strikes the target while in the liquid phase and undergoes a liquid to solid phase transition after striking the target.

6. The method of claim 5 wherein the temperature of the ink is elevated to more than 20° F. above the solid to liquid transition point.

7. A method of operating an impulse system for jetting a meltable ink which undergoes a thermally reversible liquid to solid phase transition, said method comprising the following steps:
   elevating the temperature of said ink so as to effect a solid to liquid transition; and
   ejecting a drop of liquid ink on demand toward a target wherein the drop strikes the target while in the liquid phase and undergoes a liquid to solid phase transition after striking the target and the drop penetrates the target while in the liquid state such that at least 20% of the volume of the drop is absorbed into the target.

8. The method of claim 7 wherein the drop penetrates the target while in the liquid state such that at least 50% of the volume of ink is absorbed into the target.

9. A method of operating an impulse system for jetting a meltable ink which undergoes a thermally reversible liquid to solid phase transition, said method comprising the following steps:
   elevating the temperature of said ink so as to effect a solid to liquid transition; and
   ejecting a drop of liquid ink on demand toward a target wherein the drop strikes the target while in the liquid phase and undergoes a liquid to solid phase transition after striking the target and the maximum cross-sectional dimensions of the drop on the target in the solid phase does not exceed three times the maximum cross-sectional dimensions of the drop traveling toward the target.

10. A method of operating an impulse system for jetting a meltable ink which undergoes a thermally reversible liquid to solid phase transition, said method comprising the following steps:
    elevating the temperature of said ink so as to effect a solid to liquid transition; and
    ejecting a drop of liquid ink on demand toward a target wherein the drop strikes the target while in the liquid phase and undergoes a liquid to solid phase transition after striking the target and at least 10% of the volume of ink in the drop is not absorbed by the target.

11. The method of claim 10 wherein at least 40% of the volume of ink in the drop is not absorbed by the target.

12. A method of operating an impulse system for jetting a meltable ink which undergoes a thermally reversible liquid to solid phase transition, said method comprising the following steps:
    elevating the temperature of said ink so as to effect a solid to liquid transition; and
    ejecting a drop of liquid ink on demand toward a target wherein the viscosity of the liquid ink being ejected is less than 35 centipoise.

13. The method of claim 12 wherein the viscosity of the liquid ink being ejected is less than 15 centipoise.

14. The method of claim 13 wherein the ink is wax based.

15. A method of operating an impulse ink jet juxtaposed to a substrate comprising a reservoir and an ink jet chamber including an orifice for ejecting droplets and an inlet coupled to said reservoir, said method comprising the following steps:
   storing a volume of ink in said reservoir and said chamber;
   forming a meniscus of ink in said orifice;
   heating said volume of ink so as to maintain the temperature above a predetermined temperature at which a change in phase from a substantially solid state to a substantially liquid state occurs;
   forming droplets of ink in a liquid state on demand at said meniscus at irregular intervals;
   ejecting said droplets in said liquid state from said orifice on demand at irregular intervals;
   contacting said substrate with each of said droplets wherein said droplets have a viscosity no greater than 35 centipoise in a temperature range of 135° F. to 200° F.; and
   cooling each of said droplets on contact with said substrate so as to change from a liquid to a solid state.

16. A method of operating an impulse ink jet juxtaposed to a substrate comprising a reservoir and an ink jet chamber including an orifice for ejecting droplets and an inlet coupled to said reservoir, said method comprising the following steps:
   storing a volume of ink in said reservoir and said chamber;
   forming a meniscus of ink in said orifice;
   heating said volume of ink so as to maintain the temperature more than 10° F. above a predetermined temperature at which a change in phase from a substantially solid state to a substantially liquid state occurs;
   forming droplets of ink in a liquid state on demand at said meniscus at irregular intervals;
   ejecting said droplets in said liquid state from said orifice on demand at irregular intervals;
   contacting said substrate with each of said droplets; and
   cooling each of said droplets on contact with said substrate so as to change from a liquid to a solid state wherein said droplets change from a solid state to a liquid state in the temperature range of 135° F. to 200° F.

17. A method of operating an array of impulse ink jets juxtaposed to a substrate comprising a reservoir and a plurality of ink jets, each of said jets including a chamber and an orifice for ejecting droplets and an inlet coupled to said reservoir, said method comprising the following steps:
   storing a volume of ink in said reservoir in each said chamber;
   forming a meniscus of ink in each said orifice;
   heating said volume of ink above a predetermined temperature at which a change in phase from a substantially solid state below a predetermined temperature to a substantially liquid state occurs;
   forming droplets of ink in a liquid state on demand at said meniscus at irregular intervals in each said orifice;
   ejecting said liquid droplets from each said orifice at irregular intervals;
   contacting said substrate with each of said liquid droplets wherein said droplets have a viscosity no greater than 35 centipoise in a temperature range of 135° F. to 200° F.; and
   cooling each of said droplets upon contact with said substrate so as to change from a liquid to a solid state.

18. A method of operating an array of impulse ink jets juxtaposed to a substrate comprising a reservoir and a plurality of ink jets, each of said jets including an orifice for ejecting droplets in an inlet coupled to said reservoir, said method comprising the following steps:
   storing a volume of ink in said reservoir in each said chamber;
   forming a meniscus of ink in each said orifice;
   heating said volume of ink more than 10° F. above a predetermined temperature at which a change in phase from a substantially solid state below a predetermined temperature to a substantially liquid state occurs;
   forming droplets of ink in a liquid state on demand at said meniscus at irregular intervals in each said orifice wherein said droplets change from a solid state to a liquid state in the range of 135° F. to 200° F.;
   ejecting said liquid droplets from each said orifice at irregular intervals;
   contacting said substrate with each of said liquid droplets; and
   cooling each of said droplets upon contact with said substrate so as to change from a liquid to a solid state.

19. The method of claim 18 wherein said volume of ink in said reservoir is maintained at a pressure no greater than atmospheric pressure.

* * * * *